(12) United States Patent
Miller et al.

(10) Patent No.: US 10,445,117 B2
(45) Date of Patent: Oct. 15, 2019

(54) PREDICTIVE ANALYTICS FOR VIRTUAL NETWORK FUNCTIONS

(71) Applicant: Genband US LLC, Plano, TX (US)

(72) Inventors: Paul Miller, Derry, NH (US); Ian Macfarlane, Stittsville (CA)

(73) Assignee: GENBAND US LLC, Plano, TX (US)

( * ) Notice: Subject to any disclaimer, the term of this patent is extended or adjusted under 35 U.S.C. 154(b) by 133 days.

(21) Appl. No.: 15/442,334

(22) Filed: Feb. 24, 2017

(65) Prior Publication Data
US 2018/0246746 A1    Aug. 30, 2018

(51) Int. Cl.
G06F 9/455    (2018.01)
G06F 9/50    (2006.01)
G06F 9/54    (2006.01)
G06N 7/00    (2006.01)

(52) U.S. Cl.
CPC .......... *G06F 9/455* (2013.01); *G06F 9/45533* (2013.01); *G06F 9/45558* (2013.01); *G06F 9/50* (2013.01); *G06F 9/5077* (2013.01); *G06F 9/54* (2013.01); *G06F 9/542* (2013.01); *G06N 7/005* (2013.01); *G06F 2009/4557* (2013.01); *G06F 2009/45591* (2013.01); *G06F 2009/45595* (2013.01)

(58) Field of Classification Search
CPC .. G06F 9/455; G06F 9/45533; G06F 9/45558; G06F 2009/4557; G06F 2009/45591; G06F 9/50; G06F 9/54; G06F 9/542
See application file for complete search history.

(56) References Cited

U.S. PATENT DOCUMENTS

| 2011/0119374 | A1* | 5/2011 | Ruhl ................... G06F 17/3089 709/224 |
| 2011/0215945 | A1* | 9/2011 | Peleg ................. G01M 3/2807 340/870.02 |
| 2013/0159493 | A1* | 6/2013 | Mitchell ............ G06F 11/3495 709/224 |
| 2015/0142940 | A1 | 5/2015 | McMurray et al. |
| 2015/0326448 | A1 | 11/2015 | Chaudhary et al. |
| 2016/0057075 | A1* | 2/2016 | Parikh ................. H04L 47/762 709/226 |
| 2016/0078342 | A1 | 3/2016 | Changbin |
| 2016/0188646 | A1* | 6/2016 | Zandani ............ G06F 17/30707 707/693 |

(Continued)

OTHER PUBLICATIONS

International Search Report and Written Opinion—PCT/US2018/019229—ISA/EPO—dated Jun. 21, 2018.

*Primary Examiner* — Charles M Swift
(74) *Attorney, Agent, or Firm* — Haynes and Boone, LLP (57) ABSTRACT

According to one example, a method includes, with an analytics component, receiving performance data from a Virtual Network Function (VNF), the VNF including a plurality of VNF components running on a plurality of virtual machines. The method further includes, with the analytics component, performing an analytics function on the performance data. The method further includes, with the analytics component, based on the analytics function determining a prediction event in response to determining that a set of conditions within the performance data is present. The method further includes, with the analytics component, notifying a VNF manager of the prediction event.

20 Claims, 6 Drawing Sheets

(56) References Cited

U.S. PATENT DOCUMENTS

2016/0327600 A1\*  11/2016  Pamulaparthy .......... H02H 7/04
2017/0019302 A1    1/2017   Lapiotis et al.
2017/0126792 A1\*  5/2017   Halpern .............. H04L 41/0896
2017/0134483 A1\*  5/2017   Miller ................. H04L 67/1031
2018/0227179 A1\*  8/2018   Ding ................... H04L 41/0896

\* cited by examiner

PREDICTIVE ANALYTICS FOR VIRTUAL NETWORK FUNCTIONS

BACKGROUND

The present disclosure relates generally to Network Functions Virtualization (NFV), and more particularly to methods and systems for efficient management of computing resources that support Virtual Network Functions (VNFs).

NFV is a concept that involves virtualization of various telecommunication functions that are then interconnected to provide telecommunication services. Particularly, specific telecommunication functions that are typically performed by specialized pieces of hardware are replaced with a virtualization of such hardware. One example of such hardware is a Session Border Controller (SBC). The virtualized functions that would otherwise be performed by such hardware are referred to as Virtual Network Functions (VNFs).

NFV can utilize various computing and networking technologies such as cloud computing and Software-Defined Networking (SDN). Cloud computing typically involves several physical computing systems that, through the use of a hypervisor, present virtual machine environments for use by guest operating systems. The guest operating systems can run applications as a physical computing system does. Applications related to VNFs can be run on such guest operating systems.

SDN is an approach to networking that separates the control plane from the data plane. By contrast, a legacy system may include several independently configured routers, whereas a system implementing SDN may include a central management component that makes decisions as to where traffic should be sent and then directs underlying systems to route network traffic as appropriate. SDN concepts can be used in the physical networks that interconnect the physical computing systems that provide a virtual machine environment.

SUMMARY

According to one example, a method includes, with an analytics component, receiving performance data from a Virtual Network Function (VNF), the VNF including a plurality of VNF components running on a plurality of virtual machines. The method further includes, with the analytics component, performing an analytics function on the performance data. The method further includes, with the analytics component, based on the analytics function determining a prediction event in response to determining that a set of conditions within the performance data is present. The method further includes, with the analytics component, notifying a VNF manager of the prediction event.

According to one example, a method includes, with a Virtual Network Function (VNF) manager that manages a VNF that includes a plurality of VNF components running on a plurality of virtual machines, sending performance data to an analytics component. The method further includes, with the VNF manager, receiving a notification from the analytics component, the notification indicating that a prediction event has occurred. The method further includes, with the VNF manager, in response to the notification, instructing a virtual infrastructure manager to adjust a number of VNF components within the VNF. The prediction event is based on analysis of the performance data.

According to one example, a system includes a Virtual Network Function (VNF) that includes a VNF manager and a plurality of VNF components running on a plurality of virtual machines. The system further includes an analytics component in communication with the VNF, wherein the analytics component includes a processor and a memory having machine readable instructions that when executed by the processor, cause the system to: receive performance data from the VNF, perform an analytics function on the performance data, determine a prediction event in response to determining that a set of conditions within the performance data is present, and notify the VNF manager of the prediction event.

BRIEF DESCRIPTION OF THE DRAWINGS

Aspects of the present disclosure are best understood from the following detailed description when read with the accompanying figures.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

As described above, NFV utilizes several virtual machines in a cloud computing environment to perform telecommunication functions that were previously provided by specialized pieces of hardware. One benefit of NFV is that it provides elasticity. A VNF typically includes several VNF components. In some cases, each VNF component may be running on a different virtual machine. In some cases, some VNF components may be similar instances of the same application. Such instances may handle up to a certain capacity of telecommunication services. As demand for services changes, the number of VNF components can change as well. For example, if demand increases to a certain percentage of overall capacity for the VNF, an additional VNF component can be created to increase the overall capacity of the VNF. Conversely, if demand decreases below a certain percentage of overall capacity for the VNF, a VNF component can be removed. This frees up computing resources for other applications within the cloud computing environment. While using such thresholds to provision or decommission VNF components, it is desirable to improve the efficiency of which computing resources are utilized.

According to principles described herein, a VNF can make use of past performance data to predict when various changes, such as provisioning or decommissioning VNF components, should be made. For example, it may be determined by using predictive analytics that while current utilization is not above a particular threshold, utilization is projected to rise above that threshold within a predefined period of time. By being able to predict when changes in utilization of capacity are going to occur, the thresholds that trigger changes can be set closer to full utilization. This is because there is a smaller change that an unexpected surge in utilization is going to occur. For example, without predictive analytics, it may be that the threshold that triggers provision of an additional VNF component is 80%. Using predictive analytics, as will be described in more detail below, such a threshold may be closer to full utilization, such as at 95%. By having the threshold closer to full utilization, fewer resources are unnecessarily consumed.

Figure 1:
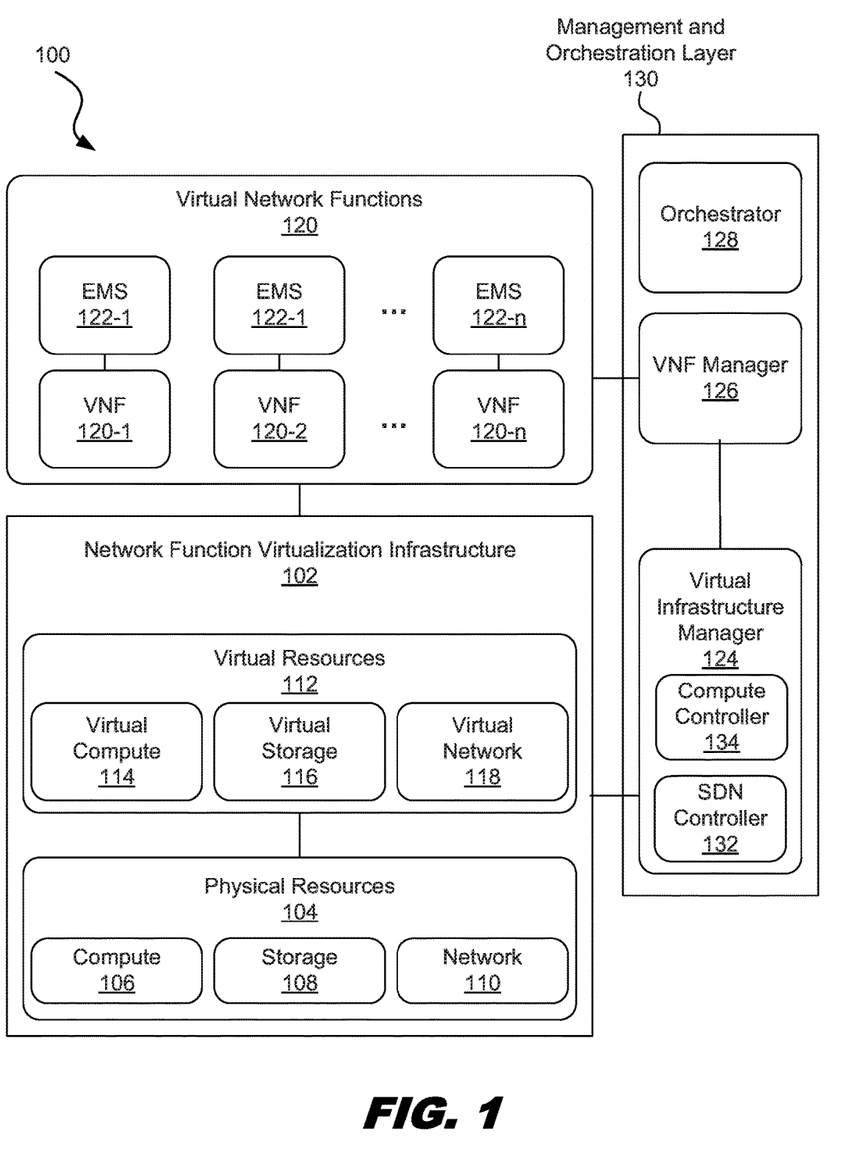
FIG. 1 is a diagram showing network function virtualization, according to one example of principles described herein.

FIG. 1 is a diagram showing network function virtualization 100. According to the present example, a Network Function Virtualization Infrastructure (NFVI) 102 is used to provide network function virtualization 100. The NFVI 102 provides the infrastructure for a number of VNFs 120. Both the VNFs 120 and the NFVI 102 are managed by a management and orchestration layer 140.

The NFVI 102 includes a set of physical resources 104 that are used to provide a set of virtual resources 112. The physical resources 104 include computing resources 106, storage resources 108, and network resources 110. Other resources, such as input/output resources are contemplated as well. The physical resources 104 are typically embodied as a plurality of physical computing systems, sometimes referred to as servers, within a datacenter. For example, a datacenter may include several servers that are positioned on racks and interconnected via physical network cables. Each of the servers includes hardware including a physical processor, a memory, and a network interface. Some servers may be designed primarily for processing power and some servers may be designed primarily for storage. In one example, the servers are commodity servers that include a number of physical processors, such as x86 processors. The servers utilize an operating system, such as Linux, to provide various applications with access to the hardware of the servers. More specifically, the operating system will schedule processing tasks on the physical processor of the server and allocate physical memory for use by the application.

The computing resources 106 include a plurality of processors within a plurality of physical computing systems. The processors are designed to process machine readable instructions to perform specifically designed tasks. The processors can be designed to work together to provide parallel processing capabilities.

The storage resources 108 include various types of memory. Some types of memory, such as non-volatile types of memory, typically have large storage volume but relatively slow performance. The storage resources 108 may include a series of hard disk drives or solid state drives that store data in the form of machine readable instructions as well as large amounts of data. The storage resources 108 may also include volatile forms of memory, such as those used for Random Access Memory (RAM), which are optimized for speed and are often referred to as "working memory."

The network resources 110 include the physical network infrastructure that provides communication between the physical computing systems as well as to an external network such as the Internet. The physical network infrastructure includes the physical cables, such as Ethernet or fiber optic, that connect the physical systems to routers, switches, and other networking equipment that provides the desired interconnectivity.

The physical resources 104 use hypervisors to provide a virtual computing environment that provides the virtual resources 112. Specifically, the hypervisors provide virtual hardware to guest operating systems. A physical computing system may provide one or more virtual machines for use by guest operating systems. The virtual resources 112 include virtual computing resources 114, virtual storage resources 116, and virtual network resources 118. Such virtual resources 112 may emulate their underlying physical resource counterparts.

The virtual computing resources 114 include virtual processors that execute machine readable instructions as a physical processor does. The hypervisor then maps the execution of those instructions to execution of instructions on a physical processor. The architecture of the virtual processor does not necessarily have to match the architecture of the underlying physical processor, which allows a variety of instruction set architectures to be used for various virtual machines.

The virtual storage resources 116 include short term and long term storage services. Specifically, the virtual machines may include virtual memory that is then mapped to physical memory by the hypervisor. There does not necessarily have to be a one-to-one mapping of virtual memory to physical memory. For example, two gigabytes of virtual working memory may be mapped to only one gigabyte of working memory in the physical system. Various paging techniques are then used to swap physical memory from working memory to a volatile storage memory to allow for such mapping.

Each virtual machine may run a guest operating system. The guest operating system may be similar to a host operating system. For example, the guest operating system may also be Linux. The guest operating system runs applications and provides such applications with access the virtual hardware of the virtual machines. For example, the guest operating system schedules processing tasks associated with the applications on the virtual processor. The guest operating system also provides the application with access to virtual memory associated with the virtual machines.

When the guest operating system provides applications running thereon with access to the virtual resources, the hypervisor of the underlying physical computing systems then maps those resources to the underlying physical resources. For example, when an application running on the guest operating system stores data in virtual memory, the hypervisor uses a translates a virtual memory address into a physical memory address and the data is stored at that physical memory address. When the guest operating system schedules processing tasks for execution on the virtual processor, the hypervisor translates those processing tasks into executable instructions for the physical processor.

The virtual machines that are provided as part of the virtual resources 112 can be interconnected to each other through one or more virtual networks that make up the virtual networking resources 118. Such virtual networks emulate physical networks. Virtual networks may include a number of machines, both physical and virtual, that are assigned a virtual network address. The virtual networks can also isolate sets of virtual machines as desired. This can be helpful if some virtual machines are owned and/or operated by one entity and other virtual machines are owned and/or operated by another entity.

The NFVI 102 is managed by an infrastructure manager 124, which is part of the management and orchestration layer 140. The infrastructure manager 124 may operate under a set of pre-defined rules that instruct the infrastructure manager how to manage the NFVI 102. Such rules may be adjusted by a human operator as desired. For example, such rules may instruct the infrastructure manager 124 how to provision additional virtual machines when instructed to do so. The infrastructure manager 124 may include hardware, software, or a combination of both to perform various management functions. For example, the infrastructure manager 124 may be an application that resides on one or more physical machines and can receive input from human administrators as well as other management functions. The infrastructure manager 124 can then manage the physical and virtual environment as appropriate. For example, if it is determined that more virtual machines are desired, then the infrastructure manager 124 can send an instruction to the NFVI to create an additional virtual machine and configure it for use by whatever entity uses that virtual machine. Additionally, the infrastructure management can cause the physical computing systems to enter standby mode if less physical computing power is desired. The infrastructure manager 124 can also take such physical computing systems out of standby mode when more computing power is desired.

In the present example, the infrastructure manager 124 includes two components. Specifically, the infrastructure manager 124 includes a compute controller 130 and an SDN controller 132. The compute controller 130 is responsible for managing the cloud computing environment provided by the virtual resources 112 of the NFVI 102. For example, the compute controller 130 may be responsible for provisioning additional virtual machines within the cloud computing environment when instructed to do so. The compute controller 130 may have access to a set of pre-defined rules. Such rules may be configured and/or defined by a human administrator. Such rules may be stored as a data structure in physical memory. In one example, such rules may instruct the compute controller 130 how to tear down a virtual machine when instructed to do so. One example of a compute controller 130 includes the open-source cloud computing software platform provided by the Openstack Foundation under the name OpenStack™ via the compute controller service called Nova.

The SDN controller 132 is used to control the network resources of the NFVI 102. The SDN controller 132 may control both the physical network resources 110 and the virtual network resources 118. As will be described in further detail below, the SDN controller 132 receives instructions from various applications for how to configure the network infrastructure. The SDN controller 132 may have access to a set of pre-defined rules. Such rules may be configured and/or defined by a human administrator. Such rules may be stored as a data structure in physical memory. One example of a rule used by the SDN controller 132 may be how to establish virtual network connections when instructed to do so. One example of a SDN controller 130 includes the open-source cloud computing software platform provided by the Openstack Foundation under the name OpenStack™ via the compute controller service called Neutron.

As described above, a VNF 120 represents a virtualization of specific telecommunication functions that are typically performed by specialized pieces of hardware. Examples of a VNF 120 include, but are not limited to, a Session Border Controller (SBC), an Advanced Media System (AMS), an Internet Protocol (IP) Multimedia Subsystem (IMS) network function, an analytics component (to be described in more detail below) and a telephony application server. A VNF 120 may include a number of components, or instances of an application, that run within the virtual machine environment. Such applications are designed to emulate the specialized pieces of telecommunication hardware. Thus, instead of setting up a new physical piece of specialized equipment, a service provider can simply spin up a virtual machine environment and run applications. Each VNF 120 may have a corresponding Element Management System (EMS) 122. The EMS 122 includes a user interface, or a dashboard, that allows an administrator to configure the VNF 120 as desired. To provide full NFV, several VNFs work together to provide the desired services. In the present example, a plurality of VNFs 120-1, 120-2 . . . 120-n and corresponding EMSs 122-1, 122-2 . . . 122-n are used to provide NFV.

An EMS 122 may have access to a set of pre-defined rules. Such rules may be configured and/or defined by a human administrator. Such rules may be stored as a data structure in physical memory. One example of a rule used by an EMS 122 may define what statistics should be collected regarding operation of the VNF 120.

A VNF 120 typically includes several different components, which may or may not be identical, that together form the full VNF 120. For example, the different components may be different instances of the VNF application. The different instances then work together to provide the functionality of the full VNF 120. Multiple VNFs 120 are then used in concert to provide a telecommunication network for a telecommunication service. A telecommunications network is an infrastructure that provides communication services between multiple subscribers. One example of a communication service is a Voice over IP (VoIP) service. Such services typically include several pieces of specialized hardware that perform specific network functions. However, according to principles described herein, the VNF 120 provides such functions instead of a specialized piece of hardware.

A VNF 120 may be part of a telecommunications core network. The core network is the central part of a telecommunications networks. The core network provides various communication services to the subscribers such as voice communication. Subscribers are connected to the core network through an access network, which will be described in further detail below. According to principles described herein, the VNF component can communicate with the core network over a first network and communicate with the access network over a second network. The first network is isolated from the second network such that communication between the VNF and the core network does not traverse the same physical network components as the communication between the VNF and the access network. Further concepts related to the core network and the access network are described in more detail below with respect to FIG. 3.

The VNFs 120 are managed by a VNF manager 126, which is part of the management and orchestration layer 140. In some cases, there may be multiple VNF managers 126, each managing one or more specific VNFs 120. The VNF manager 126 can manage the VNFs based on network demand. For example, at peak times, the VNF manager 126 can start up new instances of VNF components to scale dynamically according to demand. While there may be several VNF managers 126, there is a single orchestrator 128 that manages the VNF managers 126 and thus manages the entire NFV service. The VNF manager 126 may have access to a set of pre-defined rules. Such rules may be configured and/or defined by a human administrator. Such rules may be stored as a data structure in physical memory. One example of a rule used by the VNF manager 126 may be when to instruct the compute controller 130 to provision an additional virtual machine. For example, when demand for services reaches a certain threshold of capacity, the VNF manager 126 can instruct the compute controller to provision an additional virtual machine so that an additional VNF component can be provisioned.

Figure 2:
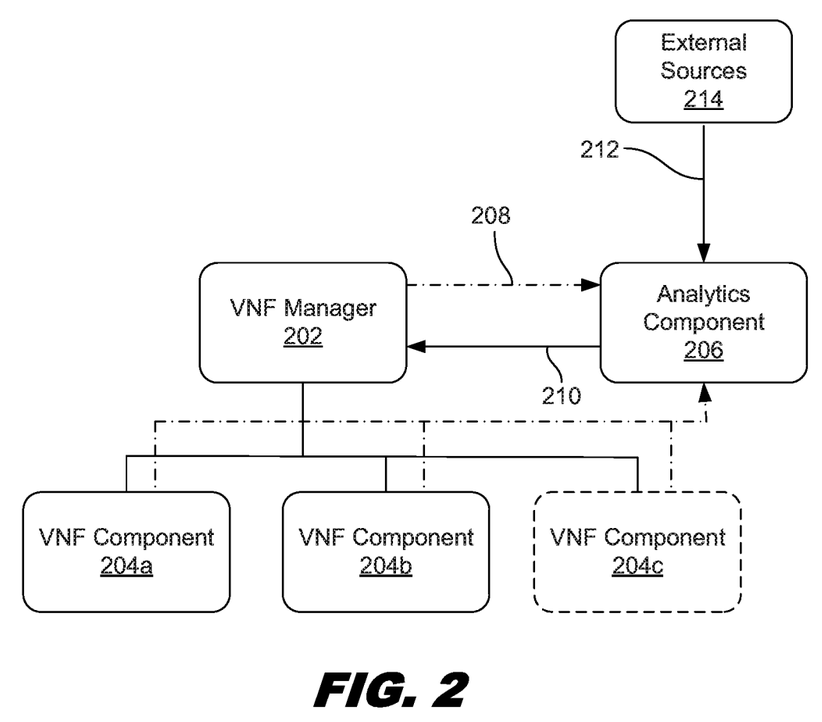
FIG. 2 is a diagram showing an analytics component interacting with a VNF manager, according to one example of principles described herein.

FIG. 2 is a diagram showing an analytics component 206 interacting with a VNF manager 202. In one example, the analytics component 206 is a physical computing system that includes the hardware and software to receive performance data 208 from various sources and apply analytics functions to that performance data. In one example, the analytics component 206 is a virtual machine such as one of the virtual machines within the network function virtual infrastructure 102. In such case, the analytics component includes the software (i.e., machine readable instructions) that when executed by the virtual machine, cause the analytics component 206 to perform analytics functions on the performance data 208. In some examples, the analytics component is embodied as a VNF. In some examples, the analytics component's software may include functions such as data collection (otherwise known as Big Data), analytics algorithm processing, post and real time data processing engines, visualization and presentation software, and protocol stacks to integrate the analytics function with service provider infrastructure needs.

The performance data 208 may be any type of data that is suitable for collection. The performance data 208 may also be referred to as Key Performance Indicators (KPI) and may include current utilization of the VNF (e.g., the number of calls currently being supported). The performance data 208 may include how many VNF component instances are currently running, how many virtual machines are supporting those VNF components, and how many physical machines are supporting those virtual machines. The performance data 208 may also include CPU load for the physical machines, network statistics (both virtual and physical) as well as any other metric that is useful for gauging performance of the VNF. The performance data 208 may also include other related data, such as cost data, subscriber data, social data, geographic data, and event data such as may be usefully correlated with the network related performance data for the purpose of analytics processing.

In some examples, the analytics component 206 may receive external data 212 from external sources 214 related to real-world events. For example, the analytics component 206 may obtain data from news networks, traffic websites, weather websites, and social media platforms. The external data 212 may then be compared with the performance data 208 to find statistically relevant correlations. For example, it may be determined that usage of the service provided by the VNF increases during various events such as concerts, sporting events, etc. It may also be determined that traffic jams or inclement weather result in changes to demand for the services provided by the VNF.

The performance data 208, as well as the external data 212 may be collected for various time scales. For example, data may be collected for analysis for minute-to-minute predictions. In other words, analysis may be performed to determine what demand for services or utilization of the VNF is projected to be within the next six minutes. On a larger scale, analysis may be performed to determine what demand for service or utilization of the VNF is projected to be at certain times of day, week, month, or year.

The analytics component 206 takes the performance data 208 and applies an analytics function to that performance data in order to derive prediction events. Analytics functions may include, but are not limited to, linear regression functions, Pearson correlation coefficient functions, and neural network functions. A linear regression function takes data points and plots a linear line through those data points. The linear line represents the mean value of the data points. A Pearson correlation coefficient is a technique for determining the confidence in the linear line. For example, if data points fall close to a straight line, then the Pearson correlation coefficient is high. Conversely, if the data points are more randomly scattered, then the Pearson correlation coefficient is low. Thus, the Pearson correlation coefficient can be used as a confidence value. Other techniques for determining confidence values are contemplated as well. Such confidence values may be useful for determining whether to respond to a prediction event or not. For example, if a prediction event indicates that utilization will increase above a threshold level within a specific period of time, but confidence in that projection is low, then it may not be worth making changes until the confidence value is higher. Conversely, if the confidence value is high, then it may be worth acting on that projection by either provisioning or decommissioning NFV components.

In some examples, the analytics function may use machine-learning techniques. Machine learning techniques generally involve comparing historical input data with a specified historical output in order to derive a model that describes the relationship between the historical input and the historical output data. Real-time input data can then be fed into the model in order to project an output. As additional data is collected regarding the real-time input and the actual output, the model is updated. For example, the historical input data may be utilization levels and changes in utilization levels over a historical period. The output data fed into the machine learning model may be the actual utilization levels and changes in utilization levels shifted by five minutes. In other words, input data is utilization at a first period of time and output data is utilization at a second period of time five minutes later than the first period of time. Using the model derived from such a comparison, real-time data may be fed as an input to project output five minutes into the future (i.e., future utilization). As time passes and the actual utilization five minutes from the instance of the input is measured, the model may be updated. Some types of machine learning techniques are referred to as neural network techniques.

In addition to analyzing historical performance data 208, the analytics component receives real-time performance data 208 from the VNF manager and/or VNF components 204a, 204b. Using the real-time performance data, and models derived from historical performance data, the analytics component may derive a prediction event. The prediction event projects a certain event that is useful to the VNF manager regarding making changes to the number of VNF components. For example, the prediction event may specify that at some point in the future, utilization of the VNF is projected to rise above a particular threshold that triggers changes in the number of VNFs. For example, the utilization might be projected to rise above 95% within the next five minutes, even though current utilization is at 75%. The analytics component 206 sends a notification 210 of such a prediction event to the VNF manager 202. The VNF manager 202 may then act on that prediction event and cause an additional VNF component 204c to be provisioned. In another example, the rate of change of network events may be predicted to increase, causing the VNF Manager to scale at a different rate (i.e., scale by elastically scaling the VNF by 2 units per scaling event instead of 1 unit per scaling event, to ensure the increase rate of change can be absorbed by the VNF in time to meet the future need)

Prediction events may be defined in a variety of ways. In one example, a prediction event projects that utilization of a VNF will rise above a predefined threshold within a predefined period of time. For example, the prediction event may indicate that utilization is projected to rise above 90% within ten minutes. In some example, a prediction event may indicate that utilization is projected to rise above a predefined threshold at a specific date and time in the future. For example, the prediction event may indicate that utilization is projected to rise above 90% next Tuesday at 6:00 PM.

In some examples, the VNF manager 202 may tell the analytics component 206 what types of prediction events it is interested in receiving for a VNF. Moreover, the VNF manager 202 may request different types of prediction events for different VNFs. For example, a VNF manager 202 may wish to know when utilization is projected to rise above 80% for a first VNF and when utilization is projected to rise above 90% for a second VNF. This may be because the first VNF takes a longer amount of time to provision an additional VNF component. In some examples, a VNF manager may request different types of prediction events for different sub-types of VNF components within a VNF.

Figure 3:
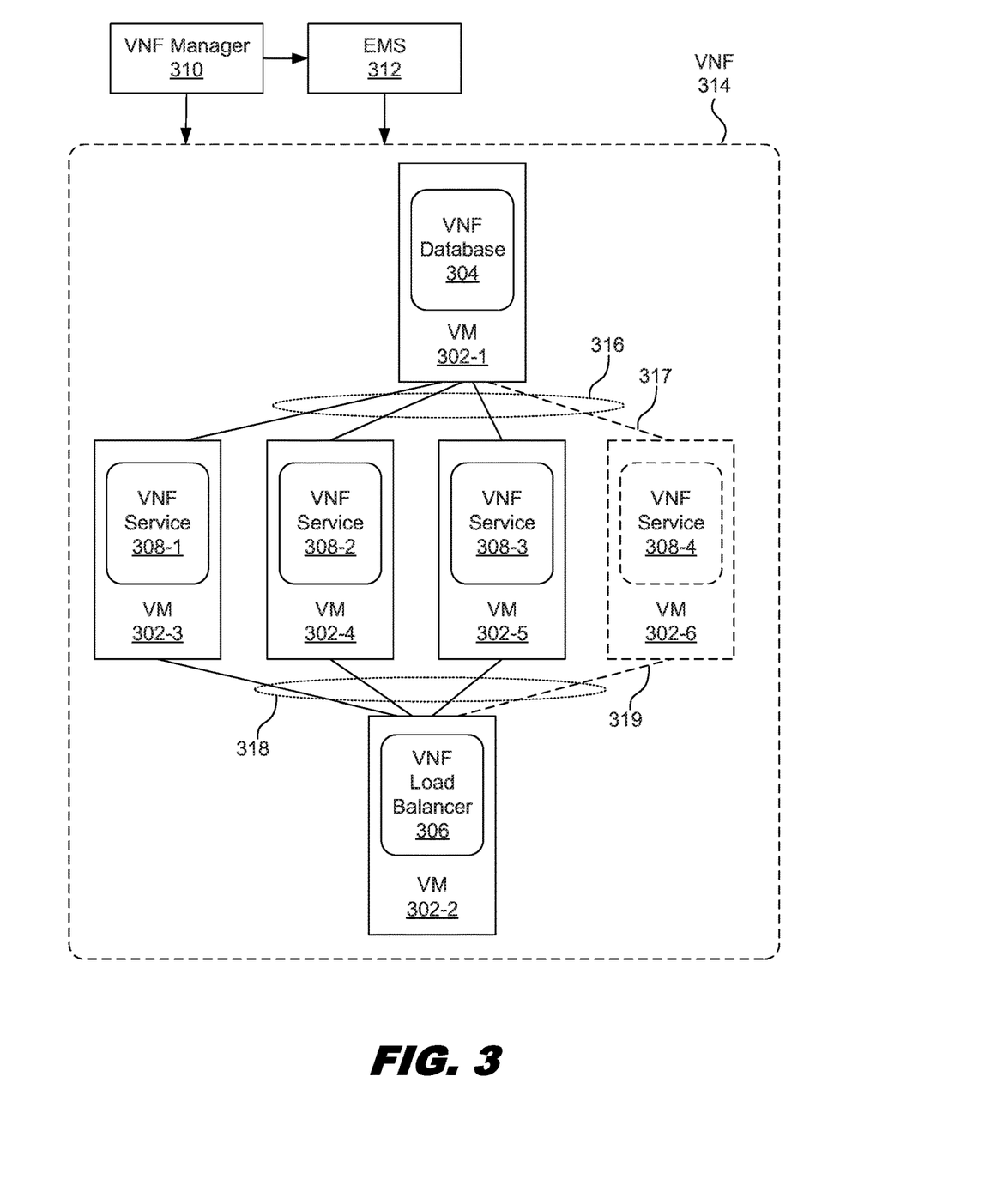
FIG. 3 is a diagram showing various components of a VNF, according to one example of principles described herein.

FIG. 3 is a diagram showing different types of VNF components that are independently scalable and for which different prediction events may be used. According to the present example, a VNF 314 is managed by a VNF manager 310. The VNF manager 310 is in communication with an EMS 312. The VNF manager 310 corresponds to the VNF manager 126 described above. The VNF 314 includes a number of VNF components 304, 306, 308. There are different types of VNF components 304, 306, 308. Specifically, the VNF 314 includes a database component 304, a load balancer component 306, and a plurality of service components 308. Each VNF component 304, 306, 308 may run on a different virtual machine 302. The VNF components illustrated herein are examples. Other types of VNF components may be used in accordance with principles described herein. For example, in some cases, there may be control VNF components and bearer VNF components.

In the present example, the database component 304 runs on virtual machine 302-1. The database component 304 stores a variety of data that is used by other VNF components. For example, the database component 304 may include subscriber related data for at least a subset of the subscribers of the telecommunication service associated with the VNF 314. While only a single database component 304 is shown, some examples may include additional database components 304. The database component 304 is connected to the service components 308 through connections 316. The connections 316 are part of a virtual network associated with the VNF 314.

In the present example, the load balancer component 306 runs on virtual machine 302-2. The load balancer component 306 balances the workload of the VNF 314 between the service component instances 308. The load balancer component 306 may also act as an access point between the core network to which the VNF 314 belongs and the access network. The access network is the part of a telecommunications network that connects a subscriber's communication device (e.g., a phone, cellular phone, or computer) to the core network. While only a single load balancer component 306 is shown, some examples may include additional load balancer components 306. The load balancer component 306 is connected to the service instances through connections 318. The connections 318 are part of the virtual network associated with the VNF 314.

In the present example, there are three service component instances 308-1, 308-2, 308-3. Service component instance 308-1 runs on virtual machine 302-3. Service component instance 308-2 runs on virtual machine 302-4. Service component instance 308-3 runs on virtual machine 302-5. The service component instances 308 perform the primary servicing functions of the VNF 314. Thus, when more subscribers are using the telecommunication service associated with the VNF 314, a greater percentage of the capacity of the VNF 314 becomes fuller.

According to one example, each of the different types of VNF components 304, 306, 308 may send performance data to the analytics component (e.g., 206, FIG. 2). In some examples, the VNF manager 314 sends performance data related to the VNF components 304, 306, 308 on behalf of the VNF components 304, 306, 308.

The analytics component can use performance data for each of the different types of VNF components to determine how utilization of one type of VNF component affects other types of VNF components. For example, it may be determined that if change in the utilization of the service component 308 is projected to rise above a particular threshold within a predefined period of time, it may be predicted that utilization of the load balancer component 306 can be projected to rise above a different threshold within a different period of time. Thus, the analytics component may provide more useful prediction events that allow the VNF manager to adjust the number of a particular type of VNF to handle predicted demand for services.

The analytics component may also use different prediction events for different types of VNF components. For example, a prediction event may be triggered for the database component if utilization of the database component 304 rises above 80% of full utilization. A prediction event may be triggered for the service VNF component 308 if utilization of the service VNF component is projected to rise above 95% of full utilization. The difference may be based on a variety of reasons. For example, it may be the case that it takes longer to provision a database VNF component 304 than a service VNF component 308.

When a new virtual machine 302-6 is created for the purpose of running a new VNF component 308-4, new connections 317, 319 are established to connect that new virtual machine 302-6 to other virtual machines 302-1, 302-2 that run other VNF components. Specifically, the new virtual machine 302-6 is connected to the virtual machines 302-1, 302-2 that run the database component 304 and the load balancer component 306. These connections are established by a Software Defined Networking controller at the request of the VNF manager (e.g. 204, FIG. 2). The automatic establishment of the connections 317, 319 through use of the SDN controller allows for the elasticity of the VNF 314 to perform more efficiently. This consumes fewer resources and thus allows the underlying physical systems to operate more efficiently. Some types of components may be provisioned more quickly than others.

In some examples, the performance data related to how quickly newly provisioned VNFs are able to come online and start normal operations can be collected. This may help determine how to structure a prediction event. For example, if it takes longer to fully provision a particular type of VNF and establish connections from that new VNF to other VNFs, then the threshold at which a prediction event for that type of VNF component is triggered may be lower. Conversely, if it takes less time to fully provision a particular type of VNF and establish connections from that new VNF to other VNFs, then the threshold at which a prediction event for that type of VNF component is triggered may be higher.

Figure 4:
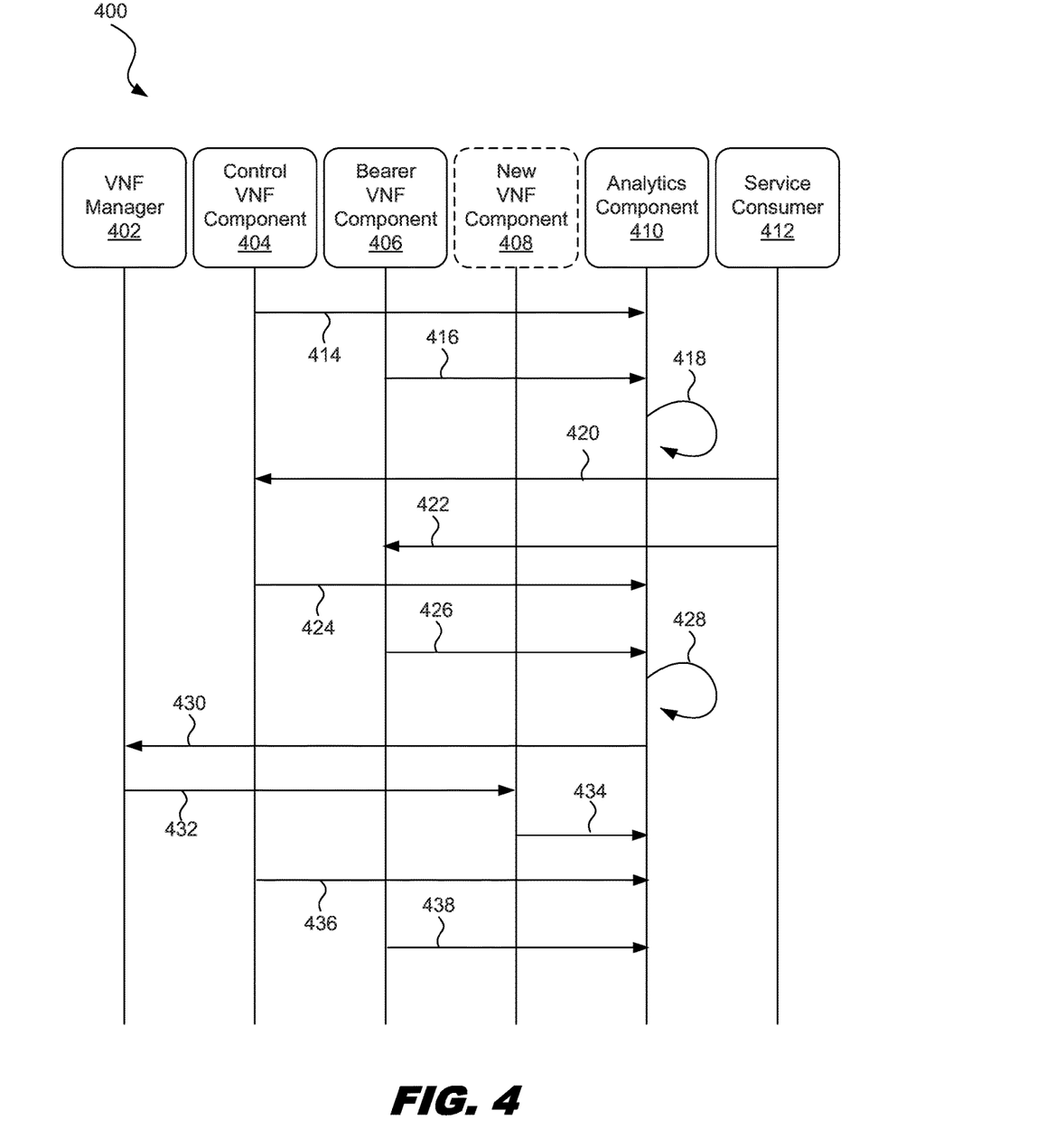
FIG. 4 is a signal diagram showing an illustrative method for using predictive analytics with a VNF, according to one example of principles described herein.

FIG. 4 is a signal diagram 400 showing an illustrative method for using predictive analytics with a VNF. The signal diagram 400 shows signals between a VNF manager 402, a control VNF component 404, a bearer VNF component 406, an analytics component 408, and a service consumer 412. The VNF manager 402 manages one or more VNFs and may be similar to VNF manager 126 of FIG. 1. The control VNF component 404 is one type of VNF component and the bearer VNF component 406 is a different type of VNF component. In one example, the control VNF component 404 may use SIP protocol to establish connections between two different endpoints and the bearer VNF component 406 may use RTP to transfer media between the two different endpoints. The analytics component 410 receives performance data and applies analytics functions to derive prediction events that project future utilization of the VNF components 404, 406. The analytics component 410 may be similar to the analytics component 206 described above in the text accompanying FIG. 2. The service consumer 412 represents subscribers that utilize the VNF services. For example, the service consumer 412 may represent calls that are being handled by the VNF associated with the VNF components 404, 406.

According to the present example, the control VNF component 404 sends signal 414 to the analytics component. Signal 414 includes performance data. Such performance data may be similar to the performance data 208 described above. Similarly, the bearer VNF component 406 sends signal 416 to the analytics component 410. Signal 416 also includes performance data. For purposes of discussion, the performance data within signals 414 and 416 may be considered historical performance data.

According to the present example, the analytics component 410, at 418, performs analytics function on the performance data it has received thus far. For example, the analytics component 410 may use linear regression and machine-learning techniques to model the performance data received in signals 414 and 416.

According to the present example, the service consumers 412 then utilize the VNF and change the demand for services provided by the VNF. Specifically, signals 420 and 422 represent use of the VNF by one or more subscribers. This changes the current utilization of the VNF.

According to the present example, the control VNF component 404 sends signal 424 to the analytics component 410. Signal 424 includes performance data. Similarly, the bearer VNF component 408 sends signal 426 to the analytics component 410. Signal 426 also includes performance data. For purposes of discussion, the performance data within signals 424 and 426 may be considered current performance data.

According to the present example, the analytics component 410, at 428, applies the current performance data to the model derived from the historical data and determines that a prediction event has occurred. In response to the prediction event, the analytics component 410 sends signal 430 to the VNF manager 402. Signal 430 notifies the VNF manager 402 that the prediction event has occurred. In the present example, the prediction event indicates that utilization is projected to soon rise above a particular threshold that will trigger provision of an additional VNF component 408. The additional VNF component 408 may be either a control or bearer VNF component.

In response to the prediction event, the VNF manager 402 sends signal 432 to provision the new VNF component 408. This may involve instructing a virtual infrastructure manager (e.g., 124, FIG. 1) to provision the additional VNF component 408. Additionally, the new VNF component 408 may be connected with all the other relevant VNF components as needed.

Moving forward, the additional VNF 408 sends signal 434 to the analytics component 410. Signal 434 includes additional performance data. Additionally, the control VNF 404 sends signal 436 to the analytics component 410 and the bearer VNF 406 sends signal 438 to the analytics component 410. Both signals 436 and 438 include additional performance data. The analytics component 410 may use the additional performance data within signals 434, 436, and 438 to update the model and/or derive further prediction events.

Figure 5:
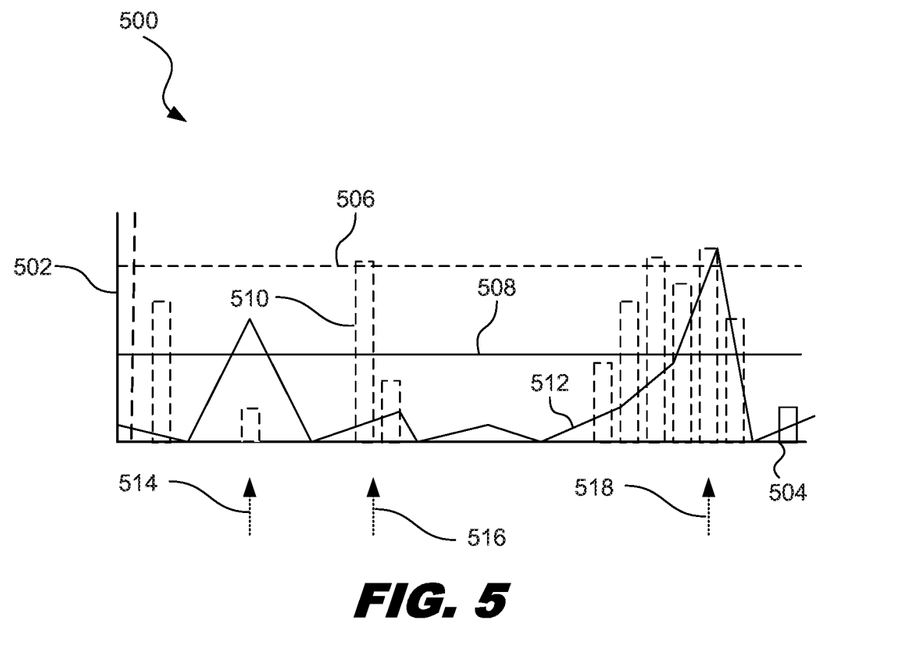
FIG. 5 is a graph showing predictive analytics for VNFs, according to one example of principles described herein.

FIG. 5 is a graph showing predictive analytics for VNFs. According to the present example the vertical axis 502 of the graph 500 indicates both projected utilization and confidence levels. In some examples, such a graph may be presented using the presentation elements of the analytics component as described above. The horizontal axis 504 represents time. The solid line 512 indicates projected utilization. The dotted bars 510 represent a confidence value associated with the corresponding projected utilization. In one example, the projected utilization is based on a linear regression function of past performance data. As described above the linear regression produces a linear line through the data points that indicates the current trend in utilization. The confidence value indicated by the dotted bars 510 may be derived using a Pearson correlation coefficient.

According to the present example, there is a confidence value threshold 506 and a projected utilization threshold. The analytics component may be configured to determine a prediction event if both the projected utilization 512 rises above its respective threshold 508 and the confidence value rises above its respective threshold 506.

In the present example, at point 514, the projected utilization 512 rises above its threshold 508. However, the corresponding confidence value is low. Accordingly, no prediction event is determined. At point 516, the confidence value is above its threshold 506. However, the projected utilization is not above its threshold. Accordingly, no prediction event is determined. At point 518, both the projected utilization 512 is above its threshold 508 and the confidence value is above its threshold 506. Accordingly, a prediction event may be triggered.

Figure 6:
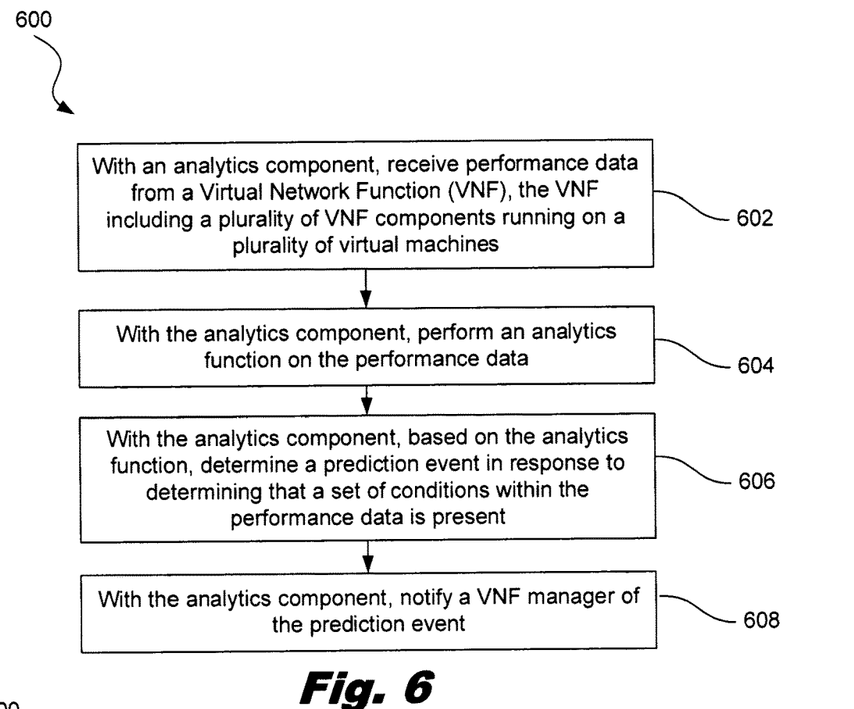
FIG. 6 is a flowchart showing an illustrative method for using predictive analytics, according to one example of principles described herein.

FIG. 6 is a flowchart showing an illustrative method 600 for using predictive analytics. According to the present example, the method 600 includes, at 602, receiving performance data from a Virtual Network Function (VNF), the VNF including a plurality of VNF components running on a plurality of virtual machines. As described above, the performance data may include a variety of key performance indicators that are collectible.

At 604, the method 600 includes performing an analytics function on the performance data. As described above, the analytics function may include machine-learning techniques as well as linear regression and Pearson correlation coefficient techniques. The analytics function may be applied periodically as new sets of performance data are received. Thus, the analytics function continues to learn from newly received performance data.

At 606, the method 600 includes, based on the analytics function, determining a prediction event in response to determining that a set of conditions within the performance data is present. The set of conditions may be that the utilization of the VNF is projected to rise above a predefined threshold within a predefined period of time. In some examples, the set of conditions may be that there is an upcoming real-world event and such event typically causes demand for the VNF to rise.

At 608, the method 600 includes notifying a VNF manager of the prediction event. By notifying the VNF manager of such an event, the VNF manager may act on that prediction event. For example, the VNF manager may provision new VNFs. Alternatively the VNF manager may decommission currently running VNFs to save computing resources. Alternatively, the VNF manager may alter the current scale or other operational parameters of an existing VNF.

Figure 7:
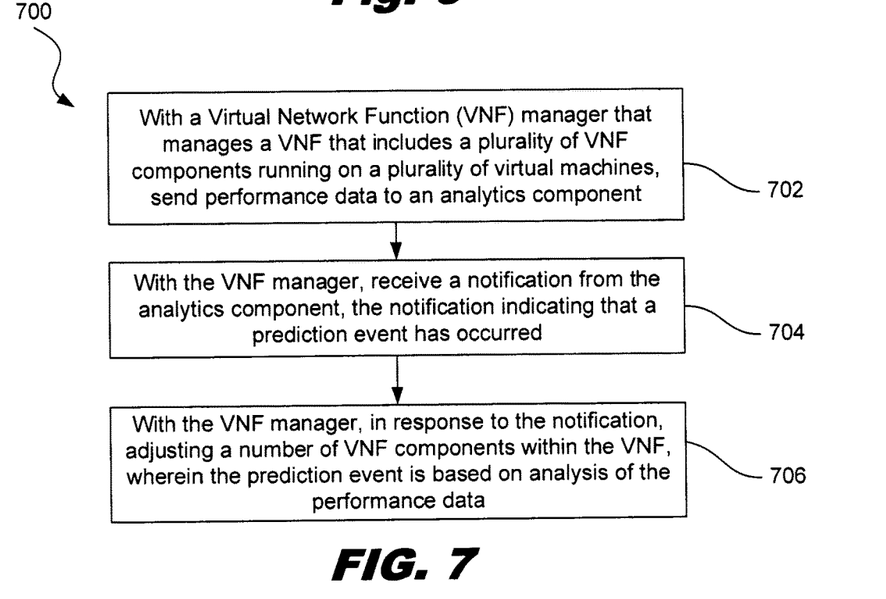
FIG. 7 is a flowchart showing an illustrative method for using predictive analytics, according to one example of principles described herein.

FIG. 7 is a flowchart showing an illustrative method 700 for using predictive analytics. According to the present example, the method 700 includes, at 702, with VNF manager that manages a VNF that includes a plurality of VNF components running on a plurality of virtual machines, sending performance data to an analytics component. In some examples the performance data may be related to the VNF as a whole, and in some examples the performance data may be specific to different VNF components. In some examples, the VNF manager sends performance data on behalf of the VNF components, and in some examples the VNF components may send performance data directly to the analytics component without going through the VNF manager.

At 704, the method 700 includes receiving a notification from the analytics component, the notification indicating that a prediction event has occurred. The prediction event may indicate, for example, utilization of the VNF is projected to rise above a predefined threshold within a predefined period of time. In some examples, the prediction event may indicate that additional VNFs should be provisioned without an indication as to why.

At 706, the method 700 includes in response to the notification adjusting a number of VNF components within the VNF. This may be done, for example, by instructing the Compute Controller 134 to add an additional VNF component. The prediction event is based on analysis of the performance data. In other words, the analytics component may determine from past performance data in current performance data, the utilization of the VNF is projected to rise above a predefined threshold within a predefined period of time.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising,
with an analytics component, receiving performance data from a Virtual Network Function (VNF), the VNF including a plurality of VNF components running on a plurality of virtual machines;
with the analytics component, performing an analytics function on the performance data, wherein the analytics function detects how changes in a number of one type of VNF component affects demand for a different type of VNF component based on performance data for different types of VNF components;
with the analytics component, based on the analytics function determining a prediction event in response to determining that a set of conditions within the performance data is present; and
with the analytics component, notifying a VNF manager of the prediction event.

2. The method of claim 1, wherein the performance data includes network conditions of networks associated with the plurality of virtual machines and utilization of the VNF components.

3. The method of claim 1, wherein the analytics function includes at least one of: a linear regression analysis, a neural network analysis, and a Pearson correlation coefficient.

4. The method of claim 1, wherein the prediction event indicates that the VNF is projected to reach a threshold level of capacity within a predetermined period of time.

5. The method of claim 1, wherein the set of conditions includes a current utilization of the VNF, an increase of utilization, and a confidence value being above respective thresholds.

6. The method of claim 1, further comprising, after notifying the VNF manager of the prediction event, receiving additional performance data from a newly provisioned VNF component.

7. The method of claim 1, further comprising:
receiving external data that includes factors that affect utilization of the VNF; and
using the external data with the analytics function to determine the prediction event.

8. The method of claim 1, wherein the different type of VNF component includes a load-balancing VNF component.

9. The method of claim 1, wherein the different type of VNF component includes a database component.

10. A method comprising:
with a Virtual Network Function (VNF) manager that manages a VNF that includes a plurality of VNF components running on a plurality of virtual machines, sending performance data to an analytics component;

with the VNF manager, receiving a notification from the analytics component, the notification indicating that a prediction event has occurred; and with the VNF manager, in response to the notification, instructing a virtual infrastructure manager to adjust a number of VNF components within the VNF;

wherein the prediction event is based on analysis of the performance data, the analytics component detects how changes in a number of one type of VNF component affects demand for a different type of VNF component based on the performance data from the one type of VNF component and the different type of VNF component.

11. The method of claim 10, wherein the prediction event indicates that the VNF is projected to reach a threshold level of capacity within a predetermined period of time.

12. The method of claim 11, wherein instructing the virtual infrastructure manager to adjust the number of VNF components comprises instructing the virtual infrastructure manager to increase the number of VNF components.

13. The method of claim 10, further comprising, in response to the notification, instructing the virtual infrastructure manager to provision an additional virtual machine.

14. The method of claim 10, wherein the prediction event indicates that the VNF is projected to fall below a threshold level of capacity within a predetermined period of time.

15. The method of claim 14, further comprising, wherein instructing the virtual infrastructure manager to adjust the number of VNF components comprises instructing the virtual infrastructure manager to decrease the number of VNF components.

16. The method of claim 10, wherein the analytics component uses machine-learning techniques.

17. The method of claim 10, wherein the analytics component uses linear regression and Pearson correlation coefficient techniques.

18. A system comprising:
a Virtual Network Function (VNF) that includes a VNF manager and a plurality of VNF components running on a plurality of virtual machines; and
an analytics component in communication with the VNF, wherein the analytics component includes a processor and a memory having machine readable instructions that when executed by the processor, cause the system to:
receive performance data from the VNF;
perform an analytics function on the performance data;
determine a prediction event in response to determining that a set of conditions within the performance data is present; and
notify the VNF manager of the prediction event;
wherein the analytics function detects how changes in a number of one type of VNF component affects demand for a different type of VNF component based on the performance data.

19. The system of claim 18, wherein the VNF manager is configured to increase a number of VNF components in response to being notified of the prediction event.

20. The system of claim 18, wherein the VNF manager is configured to define prediction events for the analytics component.

* * * * *